United States Patent [19]

Pshtissky et al.

[11] Patent Number: 4,860,101
[45] Date of Patent: Aug. 22, 1989

[54] CENTRAL STATION SYNCHRONIZATION SYSTEM

[75] Inventors: Yacov A. Pshtissky, Bayside; Shi-Yang Gao, Uniondale, both of N.Y.

[73] Assignee: Vicon Industries, Inc., Melville, N.Y.

[21] Appl. No.: 118,271

[22] Filed: Nov. 6, 1987

[51] Int. Cl.⁴ .............................................. H04N 5/04
[52] U.S. Cl. ................................................... 358/149
[58] Field of Search ....................................... 358/149

[56] References Cited

U.S. PATENT DOCUMENTS

| | | | |
|---|---|---|---|
| 3,210,470 | 10/1965 | Pieters | 358/149 |
| 3,691,295 | 9/1972 | Fisk | 358/142 |
| 3,816,658 | 6/1974 | Vidovic | 358/149 |
| 4,333,103 | 6/1982 | Koiwa et al. | 358/149 |
| 4,603,352 | 7/1986 | Kaneta et al. | 358/149 |
| 4,670,786 | 6/1987 | Ricciardi | 358/149 |

Primary Examiner—John W. Shepperd
Attorney, Agent, or Firm—Darby & Darby

[57] ABSTRACT

A system for distributing a master synchronization signal to several cameras in a CCTV system. The master synchronization signal is distributed on the same coaxial cable over which the video from the cameras is transmitted. The video sync from one camera, designated the master camera is distributed to the remaining cameras, designated the slave cameras. The level of the master sync signal is altered from normal sync level so that it may be detected and reconstructed at the camera by a video sync detector.

14 Claims, 5 Drawing Sheets

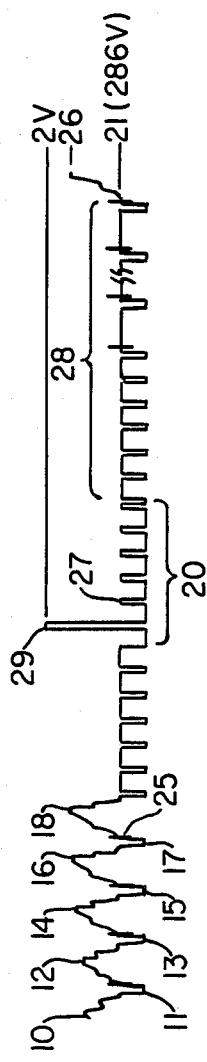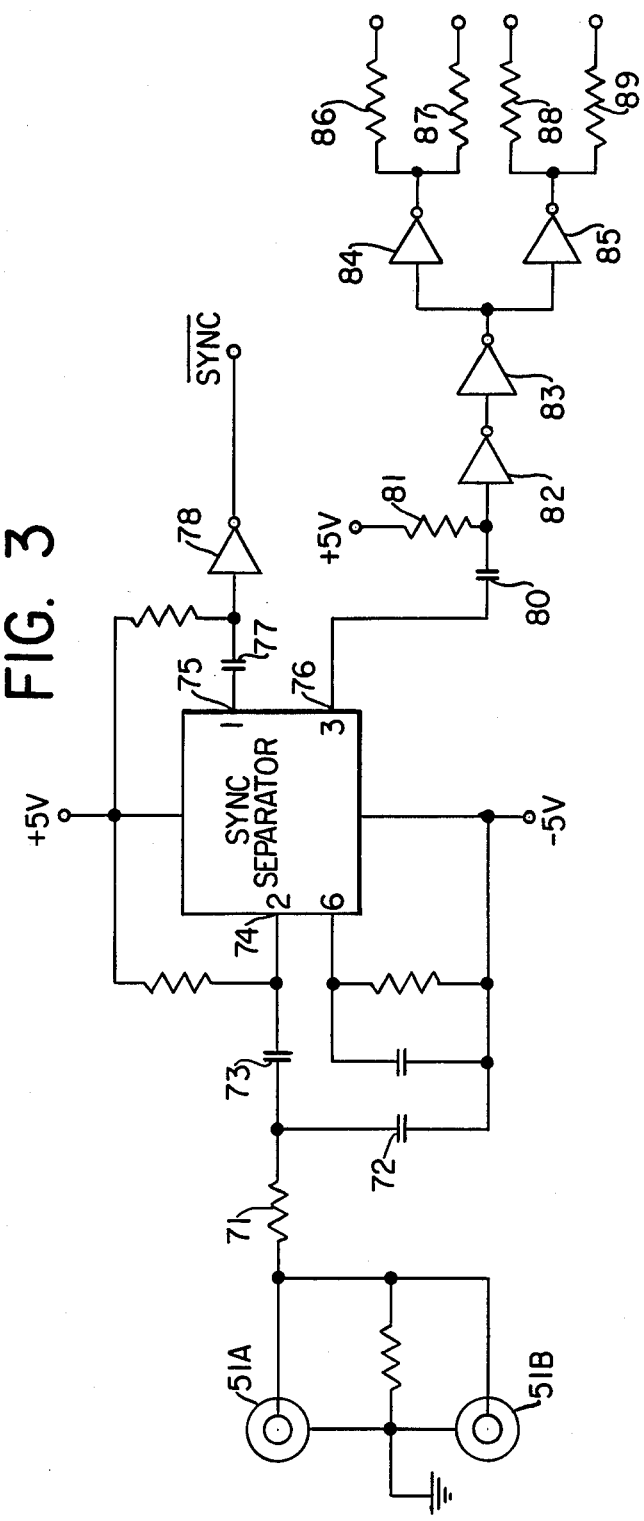

CENTRAL STATION SYNCHRONIZATION SYSTEM

BACKGROUND OF THE INVENTION

1. Field of the Invention

This invention is related to closed circuit television systems in general and a system for synchronization of remotely located cameras in particular.

2. Description of the Prior Art

Closed circuit television (CCTV) systems, particularly those used for security or surveillance, generally include a number of television cameras mounted remotely from a central monitoring station. Often these cameras are located at substantial distances from the monitoring station. For example, distances of a mile or greater are not uncommon.

The signal in NTSC television, which is the standard used in most broadcast and CCTV systems in the United States, generally contains thirty frames per second, in which each frame includes 2 fields of 262 ½ lines, or a total of sixty fields per second. Two fields are interleaved to yield a frame of 525 lines every thirtieth of a second. Each field or frame starts from the upper left hand corner of the camera's field of view, and each line begins at the left hand side of the field of view.

The video signal is most often generated by a video or television camera and received by a television or video monitor. In order for the picture information to be intelligibly reproduced by the monitor it is necessary that the cathode ray tube (CRT) in the monitor trace out or "paint" the picture from the camera on the CRT in synchronization with the generation of the picture at the video camera. Thus it is necessary that the monitor begin each frame and field at the upper left hand corner of the CRT and each successive line at the left hand side of the CRT screen in synchronism with the signal generated by the camera. In order to accomplish this synchronization, two synchronization or "sync" signals are required, namely a vertical and a horizontal sync signal.

The vertical sync signal is used to cause each frame to begin at the upper left hand corner of the CRT. Since there are sixty fields per second, and thirty frames per second this vertical synchronization signal occurs the rate of 30 hz.

The horizontal sync signal is used to cause each line painted on the CRT to begin at the left hand side of the screen. Since there are a total of 525 lines scanned thirty times per second, this takes place at a rate of 15,750 hertz.

A closed circuit television system used, for example, for security purposes, generally includes more than one camera. An operator sitting at the console ordinarily needs to be able to see what each and every camera "sees." While it is possible to have a separate monitor dedicated to each camera, it is generally far more cost effective to have a single monitor that successively receives a signal from several remote cameras and displays this information in a predetermined sequence on the monitor screen. Unless the cameras are synchronized to each other, each camera will essentially send signals having a random timing and thus the picture on the monitor will roll until it has synchronized with the next camera in the sequence. Not only is this rolling extremely distracting to a person viewing the monitors, it ultimately limits the speed at which switching between cameras takes place. This can be a particular problem in high speed switching circuits, or digital recording circuits. Such circuits record one or two frames from successive cameras on a VCR or other video tape recorder and switch between sources in as little as 32 ms.

Problems are also encountered if the operator wishes to use a split screen display. That is, one in which the left hand side of the television screen contains information from one camera and the right hand side of the screen contains picture information from another camera.

To overcome this problem, in the prior art all remote cameras are synchronized with the sixty hertz power line frequency. Since this is double the number of frames per second, and equal to the numbers of fields per second, it is often sufficient for low speed systems. Reliance on the power line frequency can only provide synchronization of the vertical sync signals, however, and not the horizontal sync signals. Furthermore, any cameras not located near the same sixty hertz power source, cannot take advantage of synchronizing to the AC power line. Thus a battery operated camera would not be in synchronism with the other cameras.

In order to overcome these problems, that is provide synchronization with even battery operated cameras, as well as provide synchronization at the horizontal sync rate, a single master synchronization reference can be generated either by one master camera (or other video sources) or the central station containing the monitors. This signal may be transferred to all the other cameras in the system. This transfer is generally performed over a separate set of wires dedicated to carrying the sync signals. In many installations, the cost of the additional wiring is prohibitive, particularly if there are numerous cameras situated at large distances from the central station.

It is thus an object of the present invention to provide a method and apparatus for permitting the synchronization of horizontal and vertical sync signals from several remotely spaced cameras.

It is a further object of the invention to permit synchronization of the sync signals from all cameras without the need for extra wiring devoted to the carrying of a master sync signal.

These and other objects, advantages and features of the invention will be more apparent upon reference to the following specification and the annexed drawings.

BRIEF DESCRIPTION OF THE DRAWINGS

FIG. 1 shows a timing diagram useful in the explanation of the present invention;

FIG. 3 is a schematic diagram of a sync generator used in the present invention;

SUMMARY OF THE INVENTION

Figure 2:
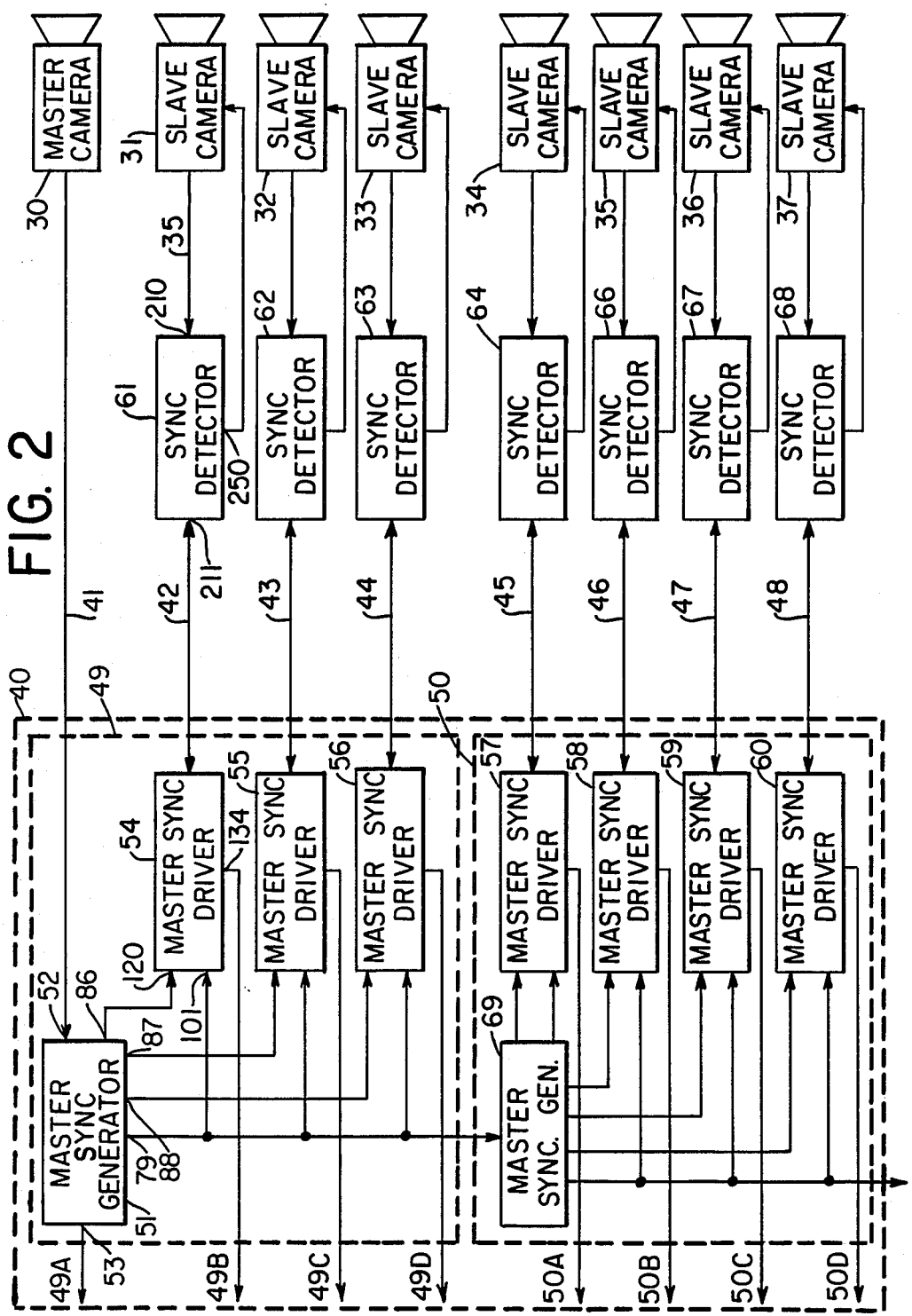
FIG. 2 shows a block diagram of the present invention.

In a preferred yet nonetheless illustrative embodiment, in a closed circuit television system having a plurality of video sources, one of the sources is designated as the master source. The vertical and horizontal synchronization signals generated by the master source are sent along with its usual video information to the central station where the synchronization signals are stripped off of the transmitted video signal. At the central station the composite sync signals from the master video source are transmitted to slave cameras over the same coaxial cable used for transmitting the slave camera's video signal. By using a signal level different from the slave camera's sync the master sync can be separated by a master sync detector at the remote slave camera.

DETAILED DESCRIPTION OF THE PREFERRED EMBODIMENTS

Refer now to FIG. 1 in which a timing diagram of an NTSC signal modified for use with the present invention is shown. This signal contains video information, 10, 12, 14 16 and 18, horizontal synchronizing pulses 11, 13, 15 and 17, and vertical synchronizing pulse 20. The synchronizing information is a series of pulses that tell the display when to start a new line (horizontal sync), and when to start a new frame (vertical sync). The process of returning to start a new scan is called the retrace or flyback. During the retrace a blanking pulse is generated to prevent writing on the display during the retrace. The NTSC video signal, when received by a video monitor, is assembled into a series of frames.

Each of the horizontal lines scans across a screen in approximately 63 microseconds, and includes a horizontal synchronization signal. The horizontal synchronization signals 11, 13, 15 and 17 are pulses present at the beginning of each scanned line and is used to synchronize the horizontal sweep of an electron beam across the monitor's CRT with a similar horizontal sweep across the imaging element of the video camera (for example, a vidicon tube). Each horizontal sweep also includes the horizontal retrace period, during which the electron beam returns to the left hand side of the screen, but is blanked, that is, it is prevented from writing on the screen by a horizontal blanking pulse.

Each horizontal line includes video information 10, 12, 14, and 16 which is comprised of a signal varying between predetermined voltage levels. The lowest voltage level 21 is shown as black on a monochrome television, and the highest voltage level 26 is white. (Color television signals also include a color burst signals 22, 23, 24, and 25 to which the amplitude and phase of the varying signal are compared to determine the colors of the line.) Each horizontal line further includes a 'back porch' portion that lies between the trailing edge of the horizontal pulses and the trailing edge of the corresponding blanking pulses.

The vertical synchronizing pulses causes the raster of 262 ½ lines to start scanning at approximately the upper left hand corner of the CRT screen. This synchronizes each field with the field originating from the video camera.

The sync pulses are divided into vertical and horizontal components according to their pulse widths, the vertical sync pulse 20 consisting of a series of wide horizontal pulses, known as equalizing pulses 27. Equalizing pulses 27 generally have a pulse width twice that of the horizontal pulses. Equalizing pulses are usually fed into an integrator where they are averaged to form one wide vertical sync pulse. The wide pulses that form the vertical synchronizing pulse are related to the horizontal sync frequency to make the horizontal oscillator stay locked- or in sync, during the vertical sync pulse. The horizontal oscillator generates the signals that control the horizontal tracing of the lines on the display.

The vertical back porch shown in FIG. 1 as region 28, has a duration of approximately 900 microseconds. The vertical back porch is typically of a duration to include 15 to 20 horizontal lines that are not used to carry picture information. Many different types of television systems, including broadcast and closed circuit systems, use the back porch area to carry information other than picture information. For example, many commercial broadcasters insert teletext, VIR signals or closed captioned signals for the hearing impaired into the 15 to 20 unused lines of the back porch. In surveillance cameras, camera control information (see, for example, applicant's copending application serial number 888,767 filed July 22, 1986) is inserted.

Refer now to FIG. 2 in which a block diagram of the present invention is shown. A plurality of cameras, 30–37, are coupled to a remote central station 40 from which the operator views the video information from the cameras and usually can also control the cameras. A single camera 30 of the plurality of cameras, is chosen as a master camera and the remaining cameras, 31–37 are designated as slave cameras. To synchronize a camera from central station 40, or any other source, a master composite (i.e including vertical and horizontal sync components) sync is sent to the camera, which generally has an input terminal for the purposes of synchronizing with an externally generated sync. The sync signals from the master camera 30, are used as master synchronization signals to which the slave cameras will be synchronized. It will be clear to those of skill in the art that any one of the cameras may be chosen as the master camera.

In the present invention the composite sync is sent to the slave cameras 31–37 over the same coaxial cables 41–48, respectively, used to transmit video from the camera to the central station.

In operation a video signal is received from master camera 30 via coaxial cable 41. This is received by master sync module 49, which in turn includes master sync generator 51 and master sync drivers 54, 55, and 56. Master sync generator 51 performs two main functions. First it detects or strips off the sync signal from the video information it receives and provides the sync signal at terminal 79. As shown, master sync detector 51 receives video information from master camera 30. The composite sync is transmitted to the camera by using a sync signal having a lower voltage level than the normal sync of the slave camera video, so that it may be separated by sync detectors 61–68 on the camera side of the coax cables 42–48, respectively.

The second major function of master sync generator 51 is to provide an identification (ID) pulse used by the sync detectors 61–68 to verify that they are receiving a master sync signal and not attempting to sync on their own sync signals. The ID signals are provided at terminals 86, 87 and 88 of master sync generator 51. In the event that the ID signal is missing, the appropriate sync detector is disabled so as to prevent the camera from going into a self synchronization state in which the sync detector for an individual camera locks onto the camera's own arbitrarily generated sync signals. To accomplish this an identification (ID) signal 29 shown in FIG. 1, having a peak on the order of 2 volts and transmitted during the vertical sync pulse, indicates the presence of the master sync signal. The level of the ID signal is considerably higher than the usual 0.286 volt peak of the negative going equalization pulses. If this peak is detected, as is further explained below, then the sync is detected and fed to the appropriate camera.

Master sync drivers, 54, 55 and 56, receive video from slave cameras 31, 32 and 33, respectively, and also send the master sync signal back to the respective slave cameras by decreasing or pulling down its voltage so that it may be distinguished from the camera's own sync signal. The video signals from the cameras may then be applied to for example, leads 50A, 50B, 50C and 50D for application to central station monitors or vcrs.

Master sync module 50, operates nearly identically to master sync module 49. It includes master sync generator 69, which generates a sync pulse and master sync drivers 57-60, which receive and distribute the ID pulses and master sync signals from master sync generator 69. There are, however, some differences between module 49 and module 50, the most salient being that module 49 contains 3 master sync drivers and module 50 contains 4. In general, each module may be designed to function with an equal number of cameras, in order to maximize system flexibility at minimal cost. In the example shown, each module functions with four cameras. In the case of module 49, however, one of the four cameras is the master camera 30. Since the master sync is derived from master camera 30, there is no need, nor would it be desireable, to transmit a master sync signal up coax cable 41 and back to master camera 30. For this reason, there is also no need to utilize a sync detector at master camera 30, so one is not shown in the example of FIG. 2.

Module 50 does include four master sync drivers, 57-60, since it in fact must be used with four cameras 34-37. It should be noted that sync signals from any video source can be detected, for example a vcr, camera or even another master sync module. This property is exploited to permit modularity of the system. Although module 50 need not detect a master sync from a camera, it still includes master sync generator 69, which operates in similar manner to master sync generator 51. Master sync generator 69 receives as its input the master sync signal emanating from terminal 79 of master sync generator 51, and not from another master camera, since it is only desireable to use but one master sync throughout an entire CCTV system, no matter how large it may be. Due to the design of the master sync generator, which will be described in greater detail below, and the fact that it can generate a sync signal from a composite video signal, it can also generate a sync signal from a composite sync signal.

The modularity permitted by this concept permits virtually an unlimited number of video sources to be synchronized to the same master sync. Thus, additional modules may be added and the master sync signal for each additional module will always be derived from the master sync generator in the previous module. While there may be some propagation delay due to this cascading of modules, there are other propagation delays as well, for example from the varying lengths of the coaxial cables, and phase delays in the circuitry. Since the propagation delays are generally small, however, they can, usually be compensated for by the horizontal phase adjustment on the camera.

Refer now to FIG. 3 which shows the master sync generator. The master sync signal is separated out by an LM1881 sync separator 70, manufactured by National Semiconductor, Inc, Santa Clara, Ca. The LM1881 is a specialized video sync separator integrated circuit that extracts timing information including horizontal and vertical sync from a standard NTSC video signal. Composite video input from the master camera 30 (or from other modules) is applied via a low pass filter comprised of resistor 71 and capacitor 72 to coupling capacitor 73 to terminal 74 (pin 2 of the integrated circuit) of sync separator 70. Composite sync output is then provided at terminal 75 (pin 1 of the integrated circuit) and the vertical sync output is provided at terminal 76 (pin 3). It will be clear to those of skill in the art that other sync separator circuits may be used, including designs using discrete components.

Sync is acquired by inverting the composite sync output at terminal 75 of the LM1881 by invertor 78. This provides an inverted sync signal denoted SYNC and provided at terminal 79. The sync signal is coupled through capacitor 77. Capacitor 80 and resistor 81 form a differential circuit used to generate the ID pulse. As mentioned above, the vertical output pulse is available at terminal 76. The vertical output pulse is a rectangular pulse typically having a width of approximately 250 uS. As is known, when such a signal is applied to a differentiator a narrow pulse, the width of which is determined by the values of resistor 81 and capacitor 80, is generated. In the present invention values of 220 pf. for capacitor 72 and 33 kohms for resistor 73 will provide a 4.4 uS pulse. The ID pulse is distributed by buffers 82, 83, 84 and 85 and resistively coupled via resistors 86, 87, 88 and 89 to a master sync drivers such as 54, 55, 56 etc. Buffers 82-85 may be provided by a 74C04 CMOS hex invertor.

Figure 4:
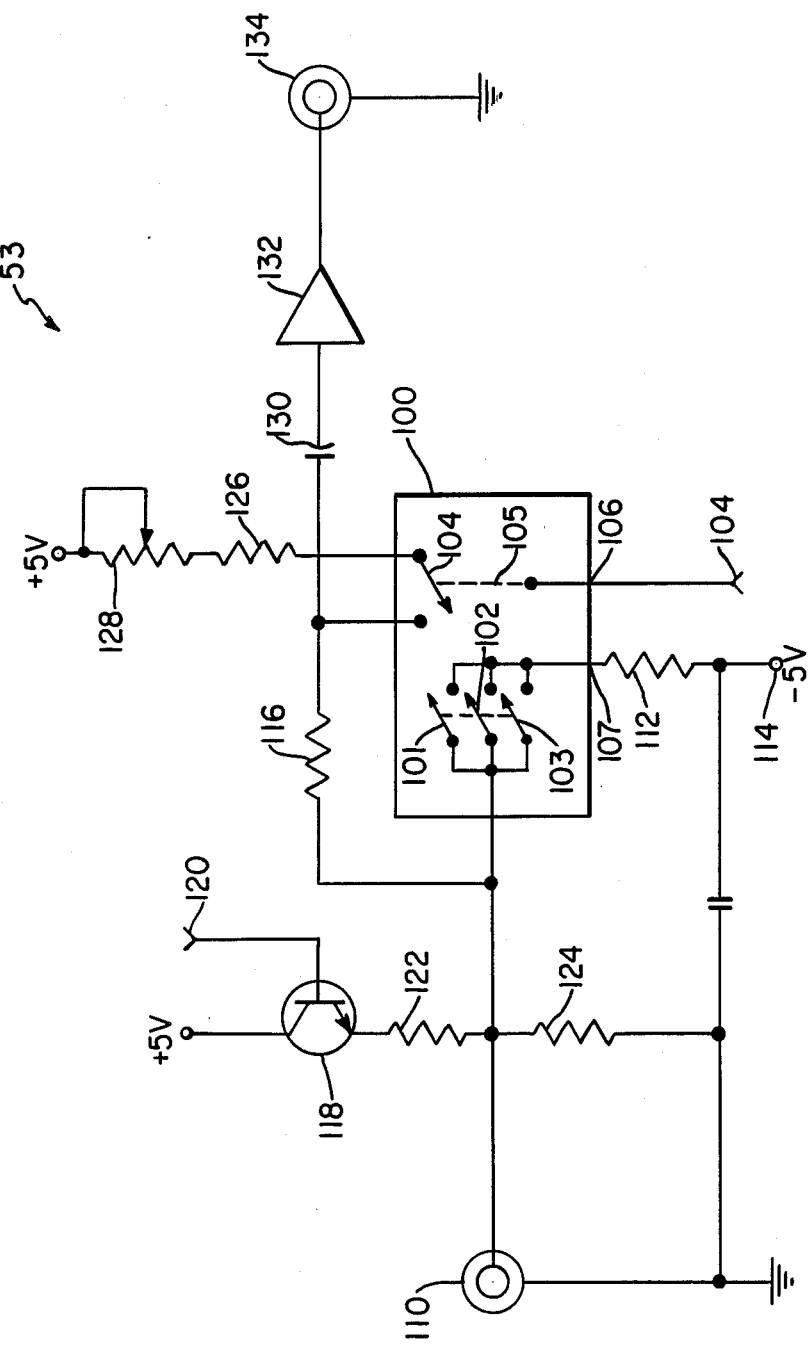
FIG. 4 is a schematic diagram of a master sync driver used in the present invention.

Refer now to FIG. 4 in which the master sync driver 54 is shown. Master sync driver 54 distributes the master sync signal to slave cameras, such as 31. Master sync driver 54 includes switch block 100, which in turn includes transmission gates 101, 102, 103 and 104. Switch block 100 may be a 74HC4066, high speed, CMOS transmission gate. Transmission gates in general, and the 4066 series integrated circuit, as used at 100, in particular, include switches, 101, 102, 103, and 104, that may be independently controlled by external signals. In the present invention, switches 101, 102 and 103 are wired in parallel, and all are controlled by a switch signal applied to terminal 106, as shown by dashed line 107. Switch 104 is also controlled, as shown by dashed line 105, by an electrical signal applied to terminal 105, but is otherwise independent of switches 101, 102, and 103. It will be clear to those of skill in the art that a single transmission gate, could be used in lieu of the triple consisting of switches 101, 102 and 103. In the present invention the three switches are wired in parallel because they are available on the 4066 integrated circuit and also because wiring the switches in parallel provides increased current carrying capacity and lower impedance.

Transmission gates 101-104 are all controlled by the sync signal applied to terminal 106, and thus are opened and closed substantially simultaneously.

Terminal 110 is connected to the coaxial cable that is coupled to the video camera, for example cable 42. Both the video signal from the camera is received at this terminal, and the master sync signal is sent up the coaxial cable to the camera from this terminal.

Switches 101, 102 and 103, which are controlled by the signal SYNC, received at terminal 108, are closed by this signal (present during the master sync) which in turn couples terminal 110 via resistor 112 to power supply rail 114 having a voltage less than 0 volts. In the embodiment shown, resistor 112 has a value of 150 ohms and the power supply rail is at a potential of −5 volts. Resistor 112 is a current limiting resistor and as used pulls the video input terminal 110 to −1.6V (−0.8V when a terminated coaxial cable is connected).

The pulled down signal is transmitted to the camera as the master sync signal via terminal 110. The ID pulse is added to the master sync by transistor 118. The base of transistor 118 is coupled to terminal 120, which is in turn coupled to the ID pulse available from, for example, terminals 86–88 and described previously. When the ID pulse is present, transistor 118 is biased on and current flows through emitter resistor 122 and terminating resistor 124 so that a positive voltage pulse is generated across resistor 124 and also applied to terminal 110.

While it is desireable to level shift the master sync signal so that it may be detected, it is not desireable to send such a level shifted sync signal to the monitors, since this may cause the monitor's circuitry to malfunction. It is thus desireable to compensate for the pulled down sync signal in the signal sent to the monitor. To compensate for the pulled down signal, the remaining quarter of transmission gate 100, namely switch 104, is used to pull the video signal back during the same period of time so that a monitor will see a signal having substantially normal sync voltage levels.

The video signal from terminal 110 is coupled via isolating resistor 116 to coupling capacitor 130 and buffer amp 132, to terminal 134. Buffer amplifier 130 is designed for driving a 75 ohm load. Isolating resistor 116 may have a value of 116 ohms in the example described. A video monitor may be coupled to terminal 134 from which it receives the video signal. When switch 104 closes, a positive voltage is applied to the video signal via variable resistor 128 and resistor 126 which are coupled in series to positive supply rail 129. Variable resistor 128 is adjusted so that a standard level sync signal is provided at terminal 134 with a length of cable used in the system and a standard camera having its iris fully opened.

Due to variations in the incoming video signal and sync amplitude, total compensation is not possible. Whatever distortion remains, however, is not significant and does not interfere with further processing or monitoring.

Figure 5:
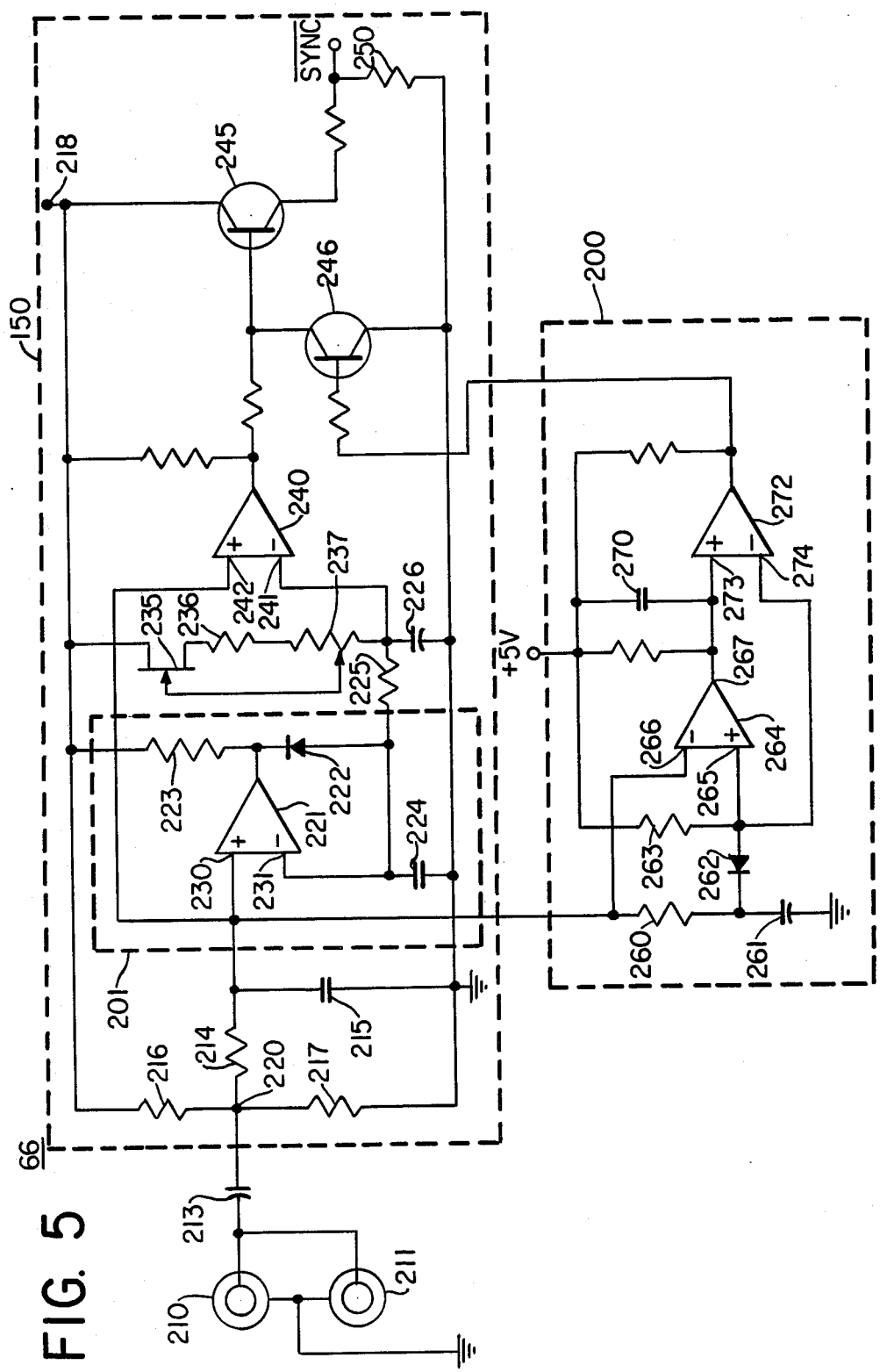
FIG. 5 is a schematic diagram of a master sync detector used in the present invention.

A master sync detector, such as 61, for an individual camera, such as 31, is shown in FIG. 5. As described previously, the master sync detector detects the master sync and ID pulse. Master sync detector 61 includes two subcircuits 150 and 200. Subcircuit 150 detects the master sync signal and uses that to generate a sync signal usable by a camera. Subcircuit 200 is essentially a threshold detector and is used to detect the ID pulse. Both circuits are described in detail below.

Video-in from, for example, slave camera 31, is received via lead 35 at terminal 210 and looped out to central station 40 via terminal 211 and coaxial cable 42. The output impedance of the camera, normally 75 ohms, provides termination for the master sync signal. It will also be recalled that the master sync signal received from master sync driver 54 is also present on coaxial cable 42 and will be received by terminal 211.

The video signal from the camera received at terminal 210 and any master sync signal at terminal 211 is capacitively coupled by capacitor 213 to a low pass filter comprised of resistor 214 and capacitor 215, which may have values respectively of 1000 ohms and 100 pf. Resistors 216 and 217 provide a dc voltage bias, since they are connected in series between the positive voltage supply at 218 and ground potential. These resistors may have equal values, and if so, will provide a voltage of V/2, where V is the positive power supply voltage, at their junction, 220.

Negative peak hold circuit 201 receives the signals from terminals 210 and 211, and includes comparator 221, diode 222, resistor 223 and capacitor 224. To insure fast response, the value of capacitor 224 cannot be high, and is selected to have a value 0.033 uf.

The negative peak detector operates as follows. Resistor 223, having a typical value of 3.3 kohms, provides current from positive power supply rail, 218, that reverse biases diode 222. When a negative signal is received by comparator 221 at the non-inverting (+) input 230, its output is driven towards its negative supply voltage, in this case ground. This forward biases diode 222, causing current to flow into capacitor 224, charging it up. The voltage held on the capacitor, provides a negative voltage at the inverting (−) input 231 of comparator 221. This in turn drives the output of comparator 221 positive (since it is applied to inverting input 231) which reverse biases diode 222 again, and isolating capacitor 224 from feedback from the comparator output until another voltage, more negative than the potential held by the charge stored in capacitor 224, is applied to non-inverting input 230 of comparator 221. The peak signal ripple is then smoothed by a RC filter comprised of 22 kohm resistor 225 and 22 uf. capacitor 226. The peak negative voltage is then applied to the inverting input 241 of comparator 242.

Junction FET 235, together with resistor 236 and variable resistor 237, function as a current source. In the present example resistor 236 and variable resistor 237 have values of 100k and 200k, respectively to supply 10 mA. of current. This in turn creates a 0.2V drop across the 22 k resistance of resistor 223. The inverting input 241 of comparator 240 is thus 0.2V higher than the peak negative signal. A current source is used to provide constant current regardless of power supply variation.

As the frequencies of the camera's video sync and the master sync drift, they will eventually coincide. When they do coincide, the lowest possible signal voltage level will result from the combined signal (that is, the camera video sync bottom and the master sync). This is the voltage which will be stored by capacitor 226. Comparator 240 then picks up the master composite sync at it non-inverting input (+) 242, and provides at its output the master synchronization signal that will synchronize the camera and lock it. Transistor 245 then operates as a buffer transistor to provide the necessary current for a 75 ohm load at terminal 250, which is connected to the sync input of camera 31.

The ID signal, which also travels up coaxial cable 42 and is received at terminal 211 is detected as follows. Resistor 260 and capacitor 261 have values of 47 kohm and 2.2 uf. respectively, and form a series RC network that averages the incoming signal level. The incoming signal, includes, of course, all signals received at terminal 211. The averaged signal is provided at the junction of resistor 260 and capacitor 261 to the cathode of diode 262. Diode 262, together with resistor 263, which has a value of 75 kohm, pulls non-inverting input 265 of comparator 264 approximately 0.5V higher than the average of the incoming signal, due to the voltage drop across the diode's junction. Therefore, the video signal peak is not picked up. The ID signal applied to inverting (−) input 266 of comparator 264 will cause output 267 of comparator 264 to ground every 1/60th of a second. It takes more than two fields time to charge 3300 pf. capacitor 270 and bring the non-inverting input (+) 273 of comparator 272 higher than the inverting (−) input 274. Thus, if capacitor 270 has the opportunity to charge, it means that at least two fields have passed without an ID signal. As long as non-inverting input 273 is lower than inverting input 274, the output of comparator 272 is at ground, and transistor 246 is kept off, permitting the sync signal from comparator 240 to be received by buffer transistor 245, and in turn, appear at terminal 250. If, however, the ID signal is not present, capacitor 270 is permitted to charge up, causing comparator 272 to go high, turning transistor 246 on, and robbing transistor 245 of its base current and consequently disabling the sync out at terminal 250.

Since a total of four comparators, 221, 240, 264, and 272, are used in the sync detector a single quad comparator may be used for maximum economy and minimum cost. Numerous quad comparator integrated circuits are known in art, and one having appropriate electrical characteristics for this circuit is the LM339 manufactured by National Semiconductor and others.

We claim:

1. An apparatus for synchronizing a plurality of remotely located video sources in a CCTV system in which signals are transmitted between said video sources and a central station, said video sources generating video source signals, said plurality of video sources comprising a master source and at least one slave video source, said slave video sources including means for receiving a sync signal and for synchronizing said video source signal to said received sync signal, each of said plurality of video sources being coupled to said central station by a respective single link, a master synchronization signal and said video signal from said video sources being placed on said single link, said apparatus comprising:
    master sync generator means coupled to said master video sources via said respective single link, for detecting synchronization signals from said master video source;
    at least one master sync driver means each coupled to said master sync generator means and to one of said at least one slave video sources by one of said single links, for one slave video sources by one of said single links, for providing a master sync signal on said respective single link, having a signal level different from a synchronization signal contained in said slave video signal; and
    at least one sync detector means for detecting said master sync, each being coupled between one of said slave video sources and one of said master sync drivers for providing said master sync to said slave video source to which said sync detector means is connected and wherein said master sync generator includes means for generating an identification signal for marking said master sync signal.

2. The apparatus according to claim 1 wherein said ID signal comprises a voltage pulse having a peak value greater than the peak of said synchronizing pulses and is added to said master sync signal during a vertical pulse of said master sync signal.

3. The apparatus according to claim 2 wherein said master sync detector is enabled by the presence of said identification signal and disabled when it is missing.

4. The apparatus according to claim 3 wherein said master sync level is lower than said video sync.

5. The apparatus according to claim 3 wherein said master sync generator comprises sync separator means for receiving a video signal and generating therefrom a composite sync output derived from said video signal at a composite sync output terminal and a vertical sync output signal derived from said video signal at a vertical sync output terminal.

6. The apparatus according to claim 5 further comprising a differentiator coupled to vertical sync output terminal for generating a narrow pulse as said identification pulse.

7. The apparatus according to claim 6 wherein said master driver means comprises:
    first terminal means for receiving video signals from said video sources;
    first switch means having an input and an output and a control means for electrically coupling said input to said output in response to a control signal, said input being coupled to said first terminal means, and said output being coupled to a negative voltage, said control means being coupled to said master sync signal from said master sync generator, said switch closing in response to said master sync signal, and said negative voltage being added to said video source signal and thereby pulling it down during the duration of said master sync signal, said pulled down signal being coupled via said first switch input to said first switch input terminal for returning said pulled down signal to said video sources; and
    output terminal means for providing a video signal to said central station.

8. The apparatus according to claim 7 wherein said master driver means further comprises:
    second switch means having an input and an output, and a control means for coupling said input to said output in response to an electrical signal applied to said control means, said second switch means input being coupled to said master driver input terminal for receiving said video signal therefrom, and said second switch output being coupled to a positive voltage source, said second switch control means being coupled to said master sync signal from said master sync generator and coupling said second switch input to said second switch output in response to said master sync signal, thereby pulling up said pulled down signal, said pulled up signal being coupled to said output terminal.

9. The apparatus according to claim 8 comprising means coupled to said master sync generator for receiving said identification signal and adding it to said video source signal.

10. The apparatus according to claim 9 wherein said master sync detector comprises:
    master sync detecting circuit, coupled to one of said slave cameras and receiving said master sync signal, for detecting the lowest level combination of said master sync signal and said slave video source signal;
    means for detecting said identifying signal; and
    means coupled to said identifying signal detection circuit for disabling said master sync detecting circuit if said identifying signal is not present.

11. The apparatus according to claim 10 wherein said master sync detecting circuit comprises:
    a first terminal coupled to said coaxial cable for receiving said master sync signal;

a second terminal coupled to said slave video source for receiving video signals therefrom, said first terminal and said second terminal being coupled together such that a combined signal is available therefrom;

a negative peak detector, for detecting and holding the most negative of said combined signals;

level shifting means for shifting the voltage level of said combined signals; and comparator means coupled to said level shifting means and to said first and second terminals for comparing said level shifted peak signal to said combined signal and for generating a signal, corresponding to said master sync signal, when said combined signal exceeds said level shifted peak negative signal.

12. The apparatus according to claim 11 wherein said level shifting means comprises a constant current source providing a predetermined current through a resistor, thereby generating a constant voltage across said resistor, said constant voltage being added to said peak negative voltage.

13. The apparatus according to claim 11 wherein said identifying means comprises a threshold detector, said threshold detector comprising:

means coupled to said first and second terminals for averaging and voltage shifting said combined signal;

second comparator means for comparing said combined signal to said average and shifted signal said second comparator, having an output, said output going to ground whenever said combined signal exceeds said averaged and shifted signal;

capacitor means coupled to said second comparator means output, for storing a charge, said capacitor means requiring more than a predetermined period to reach maximum charge; and third comparator means having a first input coupled to said capacitor means and a second input coupled to said averaging and shifting means, for comparing said averaged and shifted signal to said capacitor, said third comparator means further having an output, said output producing a disabling signal whenever said charge on said capacitor means exceeds said averaged and shifted signal, said third comparator means output being coupled to said disabling means, said disabling means disabling said master syn detector in response to said disabling signal.

14. The apparatus according to claim 13 wherein said video sources comprise video cameras and said single links comprise coaxial cables.

* * * * *